United States Patent [19]

Li

[11] Patent Number: 5,203,227
[45] Date of Patent: Apr. 20, 1993

[54] DISC-TYPED FLYWHEEL STRUCTURE FOR A PRESS

[76] Inventor: Han M. Li, P.O. Box 82-144, Taipei, Taiwan

[21] Appl. No.: 821,443

[22] Filed: Jan. 13, 1992

[51] Int. Cl.⁵ .................. G05G 1/00; F16D 55/18
[52] U.S. Cl. ............................. 74/572; 188/71.1; 188/72.4
[58] Field of Search ............ 74/572; 192/85 A; 188/71.1, 72.4

[56] References Cited

U.S. PATENT DOCUMENTS

| | | | | |
|---|---|---|---|---|
| 2,505,600 | 4/1950 | Wissman | | 188/72.4 X |
| 3,253,687 | 5/1966 | Young | | 192/85 A |
| 4,408,685 | 10/1983 | Schilling et al. | | 192/85 A |
| 4,776,442 | 10/1988 | Young | | 74/572 X |
| 4,996,892 | 5/1991 | Yonomoto | | 74/572 X |

Primary Examiner—Leslie A. Braun
Assistant Examiner—Benjamin Levi
Attorney, Agent, or Firm—Alfred Lei

[57] ABSTRACT

This invention relates to a disc-typed flywheel structure for a press and in particular to one including a sleeve arranged on a driving shaft of the press and fixedly mounted thereon by screws, a bearing enclosing the sleeve, a flywheel mounted on the bearing, a controlling base mounted on the outer side of the flywheel, and a controlling disc mounted on the driving shaft and drivingly connected with a pneumatic cylinder, whereby the press can work steadily and quietly thus ensuring the quality and accuracy of the products.

1 Claim, 4 Drawing Sheets

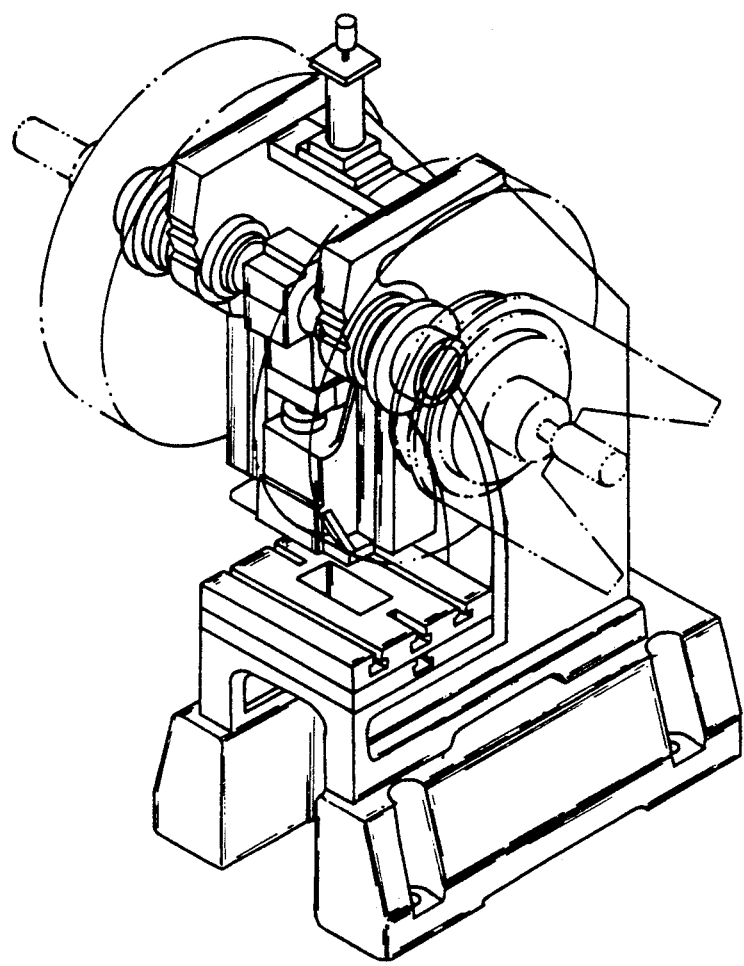
F I G. 1

DISC-TYPED FLYWHEEL STRUCTURE FOR A PRESS

BACKGROUND OF THE INVENTION

It is found that the prior art press is a machine by which something is crushed, squeezed, stamped, smoothed, etc. by pressure. However, the prior art press on the market cannot provide a steady pressure and often produce annoying noises. Further, the quality and accuracy of the goods produced by the machine are unsatisfactoy and should be improved.

Therefore, it is an object of the present invention to provide a disc-typed flywheel structure for a press which may obviate and mitigate the above-mentioned drawbacks.

SUMMARY OF THE INVENTION

This invention relates to a disc-typed flywheel structure for a press.

It is the primary object of the present invention to provide a disc-typed flywheel structure for a press which may enable the press to work steadily.

It is another object of the present invention to provide a disc-typed flywheel structure for a press which may reduce the noise produced by the press.

It is still another object of the present invention to provide a disc-typed flywheel structure for a press which may ensure the quality of the products.

It is still another object of the present invention to provide a disc-typed flywheel structure for a press which is simple in construction.

It is a further object of the present invention to provide a disc-typed flywheel structure for a press which is economic to produce.

Other objects and merits and a fuller understanding of the present invention will be obtained by those having ordinary skill in the art when the following detailed description of the preferred embodiment is read in conjunction with the accompanying drawings.

BRIEF DESCRIPTION OF THE DRAWINGS

FIG. 1 is a working view of the present invention;

DETAILED DESCRIPTION OF THE PREFERRED EMBODIMENT

Figure 2:
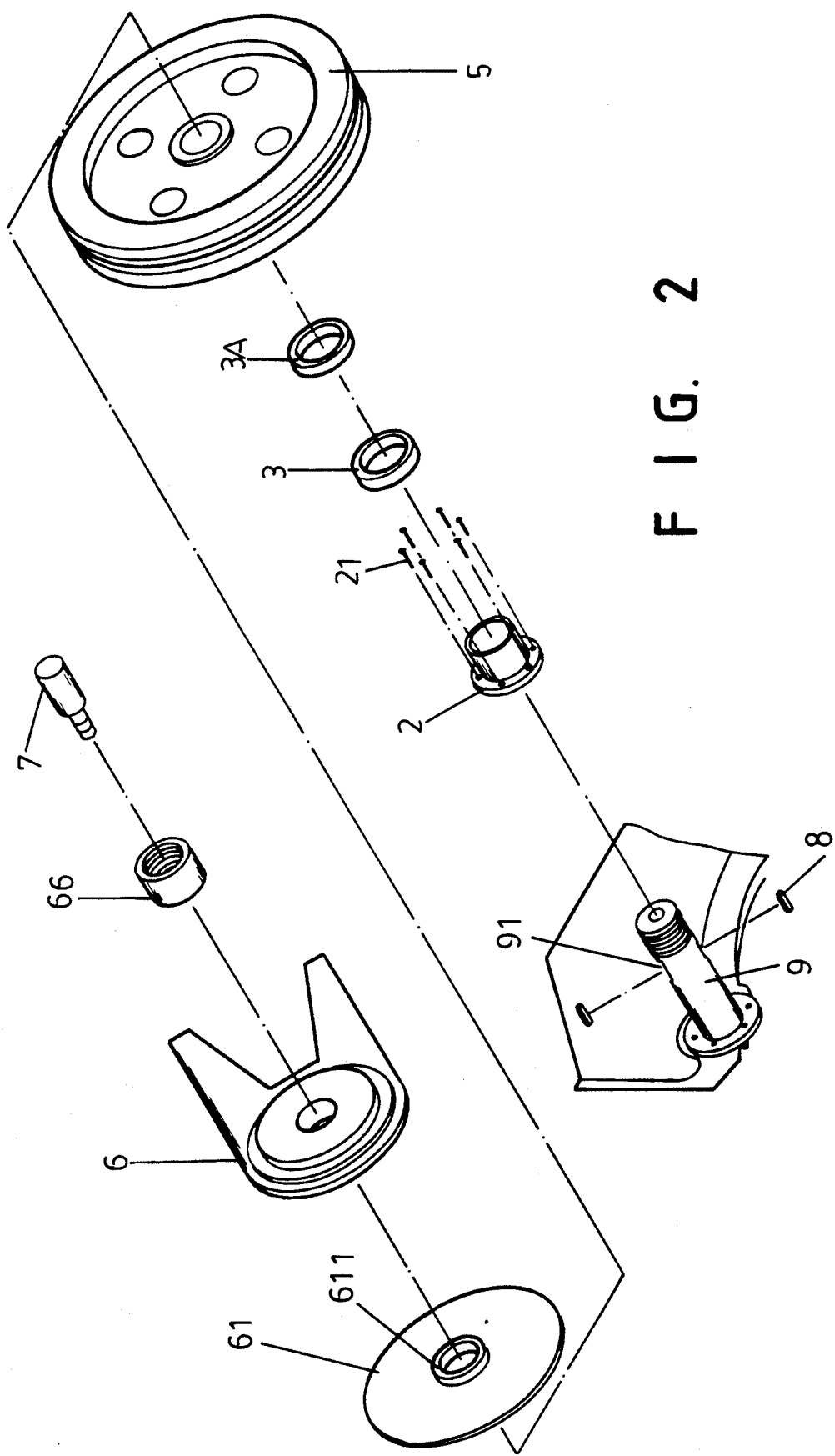
FIG. 2 is an exploded view of the present invention.
Figure 3:
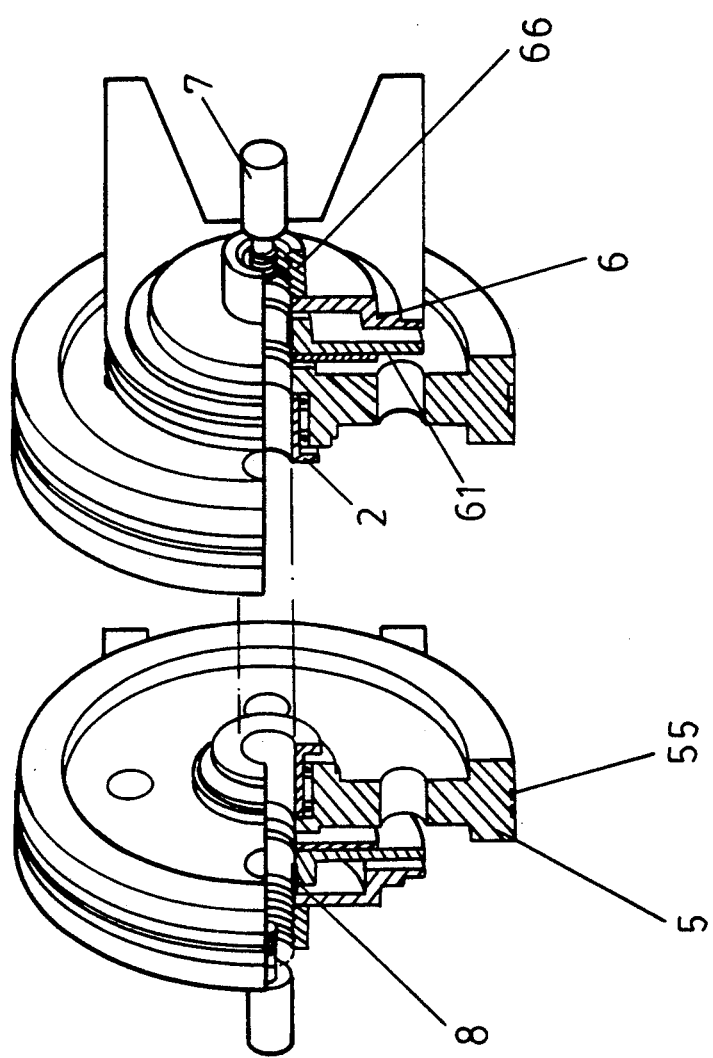
FIG. 3 is a sectional view of the present invention.

With reference to the drawings and in particular to FIGS. 1 and 3 thereof, the disc-typed flywheel structure for a press according to the present invention mainly comprises a sleeve 2, a bearing 3, a flywheel 5, a controlling disc 6, a pneumatic cylinder 7 and two pins 8. The sleeve 2 is put onto a driving axle 9 of the press and fixedly mounted thereon by a plurality of screws 21. The sleeve 2 is enclosed by the bearings 3 and 3A on which is mounted the flywheel 5. The controlling base 61 is mounted on the outer side of the flywheel 5 and has two recesses 611 adapted to two recesses 91 of the driving axle 9 so that the controlling base 61 can be rigidly mounted on the driving axle 91 by two retaining pins 8. The controlling disc 6 is disposed on the driving shaft 9 and drivingly connected with the pneumatic cylinder 7. A threaded nut 66 is engaged with the end of the driving axle 9 so as to keep the controlling disc 6 and controlling base 61 in position. The pneumatic cylinder 7 is fixedly mounted on the driving axle 9. Each end of the shaft 9 is provided with a disc-typed flywheel structure according to the present invention.

Figure 4:
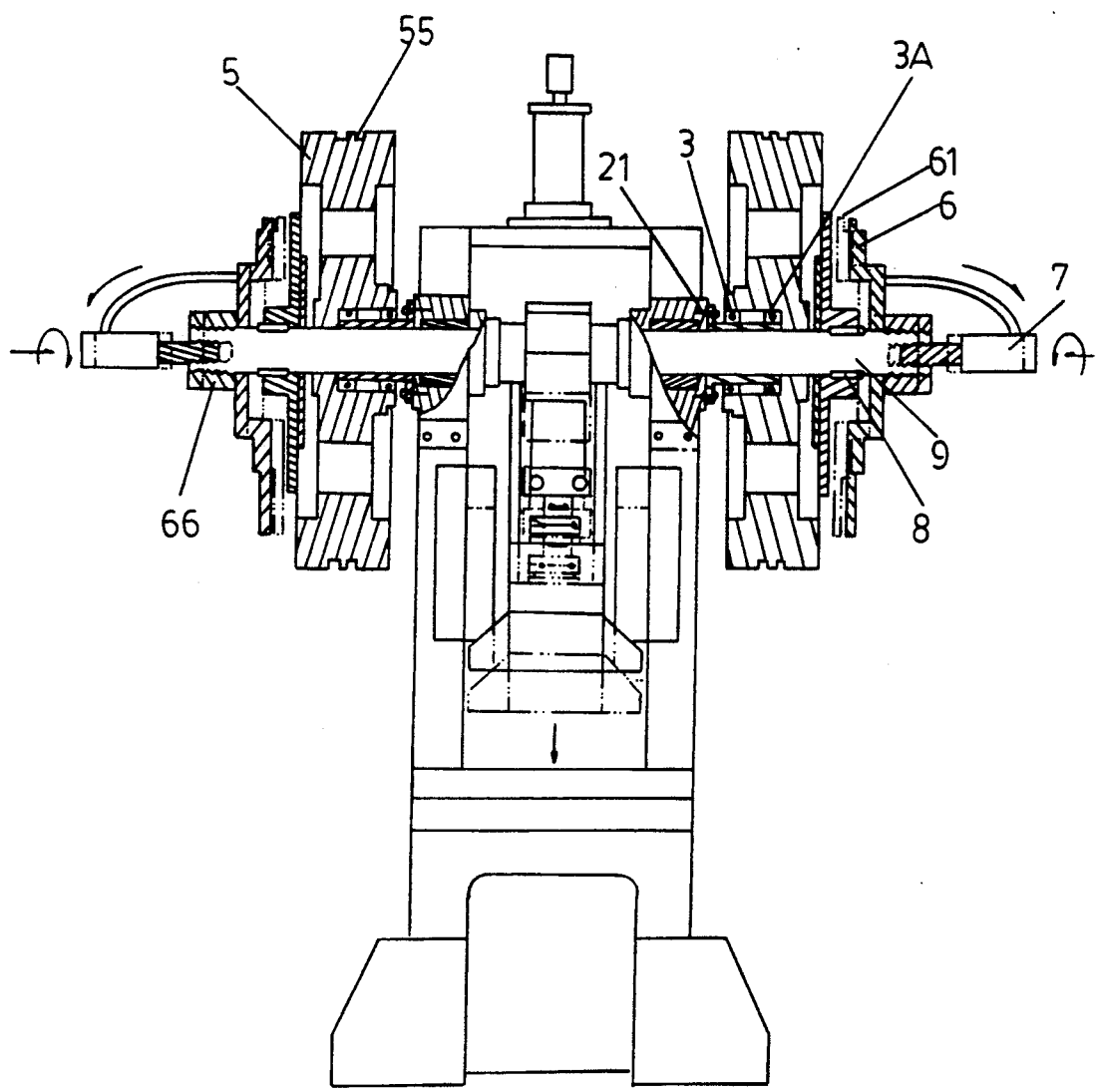
FIG. 4 is a sectional working view of the present invention.

As illustrated in FIG. 4, the grooves 55 of the flywheel 5 is connected with a motor via a belt so that the flywheel 5 may freely rotate with respect to the driving shaft 9 via the bearings 3 and 3A. When the pneumatic cylinder 7 pushes the controlling disc 6 to engage with the controlling base 61, the flywheel 5 will be able to rotate steadily thereby producing products with good quality. Further, the driving axle will not evolve heat nor produce noise hence increasing the accuracy and quality of the goods.

Although the present invention has been described with a certain degree of particularity, it is understood that the present invention is made by way of example only and that numerous changes in the detail of construction and the combination and arrangement of parts may be resorted to without departing from the spirit and scope of the invention as hereinafter claimed.

I claim:

1. A disc-typed flywheel structure for a press comprising:

a sleeve put onto a driving shaft of said press and fixedly mounted on said press:

a bearing enclosing said sleeve;

a flywheel mounted on said bearing;

a controlling base mounted on an outer side of said flywheel; and a controlling disc mounted on said driving shaft and drivingly connected with a pneumatic cylinder, said pneumatic cylinder being fixedly mounted on said driving shaft.

* * * * *